United States Patent
Moman et al.

(10) Patent No.: US 11,117,989 B2
(45) Date of Patent: Sep. 14, 2021

(54) PROCESS TO PREPARE PROCATALYST FOR POLYMERIZATION OF OLEFINS

(71) Applicant: SABIC GLOBAL TECHNOLOGIES B.V., Bergen op Zoom (NL)

(72) Inventors: Akhlaq Moman, Geleen (NL); Inaamul Haq Siddiqui, Geleen (NL); Sudhakar R. Padmanabhan, Geleen (NL); Osamah Al-Humaidan, Riyadh (SA); Haitham Al-Enazi, Riyadh (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 223 days.

(21) Appl. No.: 16/337,036

(22) PCT Filed: Sep. 14, 2017

(86) PCT No.: PCT/EP2017/073148
§ 371 (c)(1),
(2) Date: Mar. 27, 2019

(87) PCT Pub. No.: WO2018/059955
PCT Pub. Date: Apr. 5, 2018

(65) Prior Publication Data
US 2020/0048378 A1    Feb. 13, 2020

Related U.S. Application Data

(60) Provisional application No. 62/471,581, filed on Mar. 15, 2017.

(30) Foreign Application Priority Data

Sep. 29, 2016  (EP) ..................... 16191491

(51) Int. Cl.
*C08F 110/06*    (2006.01)
(52) U.S. Cl.
CPC ................. *C08F 110/06* (2013.01)
(58) Field of Classification Search
CPC .................................................... C08F 110/06
See application file for complete search history.

(56) References Cited

U.S. PATENT DOCUMENTS

| | | | |
|---|---|---|---|
| 4,946,816 | A | 8/1990 | Cohen et al. |
| 6,780,808 | B2 | 8/2004 | Wagner et al. |
| 2011/0269928 | A1 | 11/2011 | Fujiwara et al. |
| 2013/0225398 | A1 | 8/2013 | Chen et al. |
| 2015/0299346 | A1 | 10/2015 | Chen et al. |
| 2019/0225715 | A1 | 7/2019 | Moman et al. |
| 2019/0225716 | A1 | 7/2019 | Sainani et al. |
| 2019/0225718 | A1 | 7/2019 | Sainani et al. |
| 2020/0055968 | A1 | 2/2020 | Moman et al. |

FOREIGN PATENT DOCUMENTS

| | | |
|---|---|---|
| EP | 0613912 A2 | 9/1994 |
| EP | 1538167 A1 | 6/2005 |
| EP | 1783145 A1 | 5/2007 |
| EP | 2027164 B1 | 8/2012 |
| EP | 2837634 A1 | 2/2015 |
| WO | 9632427 A1 | 10/1996 |
| WO | 2011106494 A1 | 9/2011 |
| WO | 2013124063 A1 | 8/2013 |
| WO | 2014001257 A1 | 1/2014 |
| WO | 2015091982 A1 | 6/2015 |
| WO | 2015091983 A1 | 6/2015 |
| WO | 2015091984 A1 | 6/2015 |
| WO | 2015185489 A1 | 12/2015 |
| WO | 2015185490 A1 | 12/2015 |
| WO | 2015193291 A1 | 12/2015 |

OTHER PUBLICATIONS

Pasquini, N (ed.) "Polypropylene handbook," Carl Hanser Verlag Munich; 2005, 11 Pages, 2nd edition, Chapter 6.2.
Pullukat, Thomas J. and Hoff, Raymond E., "Silica-Bases Ziegler-Natta Cataiystis: A Patent Review", Catal. Rev.-Sci. Eng. 41(3&4), 1999, pp. 389-438.
International Search Report for International Application No. PCT/EP2017/073148, International Filing Date Sep. 14, 2017, dated Dec. 13, 2017, 4 pages.
Written Opinion for International Application No. PCT/EP2017/073148, International Filing Date Sep. 14, 2017, dated Dec. 13, 2017, 6 pages.

*Primary Examiner* — Catherine S Branch
(74) *Attorney, Agent, or Firm* — Cantor Colburn LLP

(57) ABSTRACT

The present invention relates to a process for the preparation of a procatalyst suitable for preparing a catalyst composition for olefin polymerization, said process comprising the steps of: Step A) providing or preparing a Grignard compound; Step B) contacting the Grignard compound with a silane compound to give a first intermediate reaction product being a solid support; Step C) activating said solid support, comprising two sub steps: Step C1) contacting the solid support obtained in step B) with at least one first activating compound and a second activating compound; and Step C2) a second activation step by contacting the activated solid support obtained in step C1) with an activating electron donor; to obtain a second intermediate reaction product; Step D) reacting the second intermediate reaction product obtained in step C) with a halogen-containing Ti-compound, optionally an activator and at least one internal electron donor in several sub steps to obtain said procatalyst. The invention moreover relates to a procatalyst, a catalytic system comprising said procatalyst and to a process to prepare polyolefins using said catalyst system and the polyolefins obtained therewith.

11 Claims, No Drawings

PROCESS TO PREPARE PROCATALYST FOR POLYMERIZATION OF OLEFINS

CROSS REFERENCE TO RELATED APPLICATIONS

This application is a National Stage application of PCT/EP2017/073148, filed Sep. 14, 2017, which claims the benefit of U.S. Application No. 62/471,581, filed Mar. 15, 2017 and European Application No. 16191491.6, filed Sep. 29, 2016, all of which are incorporated by reference in their entirety herein.

BACKGROUND

The invention relates to a process to prepare a procatalyst for polymerization of olefins comprising an activated solid support. The invention also relates to said procatalyst obtained. Furthermore, the invention is directed to a catalyst system for polymerization of olefins comprising said procatalyst, optionally a co-catalyst and optionally an external electron donor. In addition, the invention is related to a process of making polyolefins by contacting at least one olefin with said catalyst system. Moreover, the present invention relates to polymers obtained by polymerization using said procatalyst and to the shaped articles of said polymers.

Catalyst systems and their components that are suitable for preparing a polyolefin are generally known. One type of such catalysts is generally referred to as Ziegler-Natta catalysts. The term "Ziegler-Natta" is known in the art and it typically refers to catalyst systems comprising an organometallic compound (also called a co-catalyst) and optionally one or more electron donor compounds (e.g. external electron donors) and a transition metal-containing solid catalyst compound (also typically referred to as a procatalyst). Said procatalyst comprising a transition metal halide (e.g. titanium halide, chromium halide, hafnium halide, zirconium halide, vanadium halide) supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1. There is, an on-going need in industry for phthalate free catalyst for preparing polymers.

It is an object of the invention to provide an improved process for a phthalate free procatalyst for polymerization of olefins. It is a further object of the present invention is to provide a procatalyst which shows good performance, especially shows an improved productivity, bulk density and Mn (low oligomers) and a narrow MWD.

SUMMARY

At least one of the aforementioned objects of the present invention is achieved with the several aspects discussed below.

The present invention relates to a process for the preparation of a procatalyst suitable for preparing a catalyst composition for olefin polymerization, said process comprising the steps of: Step A) providing or preparing a Grignard compound; Step B) contacting the Grignard compound with a silane compound to give a first intermediate reaction product being a solid support; Step C) activating said solid support, comprising two sub steps: Step C1) contacting the solid support obtained in step B) with at least one first activating compound and a second activating compound being an activating electron donor; and Step C2) a second activation step by contacting the activated solid support obtained in step C1) with an activating electron donor; to obtain a second intermediate reaction product; Step D) reacting the second intermediate reaction product obtained step C) with a halogen-containing Ti-compound, optionally an activator, and at least one internal electron donor in several sub steps to obtain said procatalyst.

A first aspect of the present invention is a process for the preparation of a procatalyst suitable for preparing a catalyst composition for olefin polymerization, said process comprising the steps as disclosed in claim 1. This process involves a two-step activation of the solid support.

A second aspect of the present invention, is a procatalyst directly obtained by the process according to the invention. A third aspect of the present invention, is a process for the preparation of polyolefins, preferably polypropylene, comprising the contacting of a procatalyst with an olefin, and optionally an external donor and/or optionally a co-catalyst or contacting a catalyst system—comprising a procatalyst, an external donor and a co-catalyst, with an olefin. A fourth aspect of the present invention, is a polyolefin, preferably a polypropylene, obtainable by said process. A fifth aspect is a shaped article. These aspects and embodiments will be described in more detail below.

Definitions

The following definitions are used in the present description and claims to define the stated subject matter. Other terms not cited below are meant to have the generally accepted meaning in the field.

"Ziegler-Natta catalyst" as used in the present description means: a transition metal-containing solid catalyst compound comprises catalytic species supported on a metal or metalloid compound (e.g. a magnesium compound or a silica compound).

"catalytic species" as used in the present description means: a transition metal-containing species comprises a transition metal halide selected from titanium halide, chromium halide, hafnium halide, zirconium halide and vanadium halide.

"internal donor" or "internal electron donor" or "ID" as used in the present description means: an electron-donating compound containing one or more atoms of oxygen (O) and/or nitrogen (N).

"external donor" or "external electron donor" or "ED" as used in the present description means: an electron-donating compound used as a reactant in the polymerisation of olefins. It comprises at least one functional group that is capable of donating at least one pair of electrons to a metal atom.

"activator" as used in the present description means: an electron-donating compound containing one or more atoms of oxygen (O) and/or nitrogen (N) which is used during the synthesis of the procatalyst and is added prior to or simultaneous with the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals. Where in the description the terms metal modifier or metal-based modifier is used, Group 13- or transition metal modifier is meant.

"procatalyst" as used in the present description have the same meaning: a component of a catalyst composition generally comprising a solid support, a transition metal-containing catalytic species and optionally one or more internal donor.

"halide" or "halogen" as used in the present description means: an ion selected from the group of: fluoride (F—), chloride (Cl—), bromide (Br—) or iodide (I—).

"Heteroatom" as used in the present description means: an atom other than carbon or hydrogen. However, as used herein—unless specified otherwise, such as below,—when "one or more hetereoatoms" is used one or more of the following is meant: F, Cl, Br, I, N, O, P, B, S or Si. Thus a heteroatom also includes halides.

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl. A hydrocarbyl group may be substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be un-substituted or substituted. An alkyl group also encloses aralkyl groups wherein one or more hydrogen atoms of the alkyl group have been replaced by aryl groups.

"aryl" as used in the present description means: an aryl group being a functional group or side-chain derived from an aromatic ring. An aryl group and may be un-substituted or substituted with straight or branched hydrocarbyl groups. An aryl group also encloses alkaryl groups wherein one or more hydrogen atoms on the aromatic ring have been replaced by alkyl groups.

"alkoxide" or "alkoxy" as used in the present description means: a functional group or side-chain obtained from an alkyl alcohol. It consists of an alkyl bonded to a negatively charged oxygen atom.

"aryloxide" or "aryloxy" or "phenoxide" as used in the present description means: a functional group or side-chain obtained from an aryl alcohol. It consists of an aryl bonded to a negatively charged oxygen atom.

"Grignard reagent" or "Grignard compound" as used in the present description means: a compound or a mixture of compounds of formula $R^4_z MgX^4_{2-z}$ ($R^4$, z, and $X^4$ are as defined below) or it may be a complex having more Mg clusters, e.g. $R_4Mg_3Cl_2$.

"polymer" as used in the present description means: a chemical compound comprising repeating structural units, wherein the structural units are monomers.

"olefin" as used in the present description means: an alkene.

"olefin-based polymer" or "polyolefin" as used in the present description means: a polymer of one or more alkenes.

"propylene-based polymer" as used in the present description means: a polymer of propylene and optionally a comonomer.

"polypropylene" as used in the present description means: a polymer of propylene.

"copolymer" as used in the present description means: a polymer prepared from two or more different monomers.

"monomer" as used in the present description means: a chemical compound that can undergo polymerization.

"MWD" or "Molecular weight distribution" as used in the present description means: the same as "PDI" or "polydispersity index". It is the ratio of the weight-average molecular weight ($M_w$) to the number average molecular weight ($M_n$), viz. $M_w/M_n$, and is used as a measure of the broadness of molecular weight distribution of a polymer. $M_w$ and $M_n$ are determined by GPC using a Waters 150° C. gel permeation chromatograph combined with a Viscotek 100 differential viscosimeter; the chromatograms were run at 140° C. using 1,2,4-trichlorobenzene as a solvent; the refractive index detector was used to collect the signal for molecular weights.

"bulk density" as used in the present description means: the weight per unit volume of a material, including voids inherent in the material as tested. Bulk density is measured as apparent density according to ASTM D1895-96 Reapproved 2010-e1, test method A.

"XS" or "xylene soluble fraction" or "CXS" or "cold soluble xylene fraction" as used in the present description means: the weight percentage (wt. %) of soluble xylene in the isolated polymer, measured according to ASTM D 5492-10.

"polymerization conditions" as used in the present description means: temperature and pressure parameters within a polymerization reactor suitable for promoting polymerization between the catalyst composition and an olefin to form the desired polymer. These conditions depend on the type of polymerization used.

"production rate" or "yield" as used in the present description means: the amount of kilograms of polymer produced per gram of procatalyst consumed in the polymerization reactor per hour, unless stated otherwise.

"MFR" or "Melt Flow rate" as used in the present description is measured at a temperature of 230° C. with 2.16 kg load and measured according to ISO 1133:2005.

Unless stated otherwise, when it is stated that any R group is "independently selected from" this means that when several of the same R groups are present in a molecule they may have the same meaning or they may not have the same meaning. The present invention is described below in more detail. All embodiments described with respect to one aspect of the present invention are also applicable to the other aspects of the invention, unless otherwise stated.

DETAILED DESCRIPTION OF EMBODIMENTS

It has been surprisingly found that the properties of the procatalyst can be improved by an improved method according to the first aspect of the present invention.

An advantage of the present invention, using a double activation step of the solid support, is that high catalyst productivity is obtained. Another advantage is the increased bulk density of the polyolefin obtained. Another advantage is a more narrow molecular weight distribution of the polyolefin obtained. Another advantage is the increased Mn (low oligomers) and low xylene solubles of the polyolefin that is obtained. Hence enhanced product physical and mechanical properties are expected such as for fibres, injection molded products and films when such products are obtained using the present invention.

As stated above, the first aspect of the invention relates to a multistep process comprising steps A), B), C) and D): viz.

to a process for the preparation of a procatalyst suitable for preparing a catalyst composition for olefin polymerization, said process comprising the steps of: Step A) providing or preparing a Grignard compound; Step B) contacting the Grignard compound an alkoxy- or aryloxy silane compound, to give a solid support; Step C) firstly contacting the solid support obtained with a first activating compound, viz. at least one activating metal alkoxide compound and a second activating compound, viz. an activating electron donor (step C1) and secondly contacting the (partly) activated support with an activating electron donor (Step C2); and Step D) reacting the activated support with a halogen-containing Ti-compound as catalytic species, optionally an activator and at least one internal electron donor, preferably in several sub steps or stages. Each of these steps A), B), C) and D) is disclosed in more detail below. These steps are shown in claim 1 for the first aspect of the invention.

Preferably, the Ziegler-Natta type procatalyst in the catalyst system according to the present invention is obtained by the process that is similar to the process as described in EP2027164B1. Example I including all sub-examples (IA-IE) is incorporated into the present description. More details about the different embodiments are disclosed starting in paragraphs [0016] to [0089]. All these embodiments related to the process and products are incorporated by reference into the present description. In the following part of the description the different steps and phases of the process for preparing the procatalyst according to the present invention will be discussed.

The process for preparing a procatalyst according to the present invention comprises the following phases or steps
  phase I): preparing a solid support for the procatalyst (Step A and Step B);
  phase II): activating said solid support obtained in phase I using at least two activating compounds in at least two activating steps (C1 and C2) to obtain an activated solid support; (Step C)
  phase III): contacting said activated solid support in phase II with a catalytic species, optionally an activator and at least one internal donor (Step D).
  and optionally Phase IV): modifying said intermediate product obtained in phase III wherein phase IV may comprise one of the following: modifying said intermediate product obtained in phase III with a Group 13- or transition metal modifier in case an internal donor was used during phase III, in order to obtain a procatalyst; modifying said intermediate product obtained in phase III with a Group 13- or transition metal modifier and an internal donor in case an activator was used during phase III, in order to obtain a procatalyst.

The procatalyst thus prepared can be used in polymerization of olefins using e.g. an external electron donor and a co-catalyst. The various steps used to prepare the catalyst according to the present invention are described in more detail below.

Phase I: Preparing a Solid Support for the Catalyst.

The process for preparing the solid support for the procatalyst according to the present invention comprises the following steps: step A) provision or preparation of a Grignard reagent; and Step B) reacting a Grignard compound with a silane compound.

Step A) may include the provision of a previously prepared or commercially obtained Grignard reagent or may include the preparation of a Grignard reagent. Said Grignard reagent that is provided or prepared in step A is a compound $R^4_zMgX^4_{2-z}$. $R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms; preferably $R^4$ is phenyl or butyl, more preferably butyl. $X^4$ is independently selected from the group consisting of fluoride (F—), chloride (Cl—), bromide (Br—) or iodide (I—), preferably chloride. z is in a range of larger than 0 and smaller than 2, being 0<z<2. For example $R^4_zMgX^4_{2-z}$ is n-butyl magnesium chloride or phenyl magnesium chloride wherein $R^4$ is respectively n-butyl or phenyl, z=1 and X=Cl. Step A) including many embodiments, is described in detail in WO2015091984 A1 of the same applicant, page 15 line 14 to page 16, line 28, which complete section is incorporated here by reference.

Step B) includes contacting the compound $R^4_zMgX^4_{2-z}$ (defined above for step A) with a silane compound $Si(OR^5)_{4-n}(R^6)_n$ to give a first intermediate reaction product, being a solid $Mg(OR^1)_xX^1_{2-x}$ wherein $R^1$, $R^5$ and $R^6$ are each independently selected from linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^1$ is independently selected from the group of consisting of fluoride (F—), chloride (Cl—), bromide (Br—) or iodide (I—), preferably chloride; n is in range of 0 to 4, preferably n is from 0 up to and including 1; x is in a range of larger than 0 and smaller than 2, being 0<x<2. Preferably tetraethoxysilane (TES; $R^5$=ethyl, n=0) is used during step B) as the silane compound to provide a compound of formula $Mg(OR^1)_xX^1_{2-x}$ wherein $R^1$ is Et and $X^1$ is Cl. Step B), including many embodiments, is described in detail in WO2015091984 A1, page 16 line 30 to page 22, line 25, which complete section is incorporated here by reference.

Phase II: Activating said Solid Support for the Catalyst (Step C).

This step of activating said solid support for the catalyst is a key step in the present invention and comprises two sub steps: C1) and C2).

Step C1) includes contacting the solid support obtained in step B) with at least one activating compound being a metal alkoxide compound of formula $M^1(OR^2)_{v-w}(OR^3)_w$ or $M^2(OR^2)_{v-w}(R^3)_w$, to obtain a partly activated reaction product; wherein: $M^1$ is a metal selected from the group consisting of Ti, Zr, Hf, Al or Si; $M^2$ is a metal being Si; v is the valency of $M^1$ or $M^2$ and w is smaller than v; v for example being 3 or 4 and w for example being 0, 1, or 2; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms. A second activating compound is used, being an activating electron donor. More preferably as activating electron donor an alcohol is used, such as methanol or ethanol, ethanol being more preferred. A process disclosing an activation with one single activating compound being either an activating electron donor or a metal alkoxide is described in detail in WO2015091984 A1 of the same applicant, page 23 line 3 to page 28, line 14, which complete section is incorporated here by reference. It should be noted that the present invention relates to the activation with both an activating electron donor and a metal alkoxide. According to the present invention, the solid support and procatalyst preferably have an average particle size (or APS) of between 18-30 microns. The particle size is measured using a test method based on ASTM standard test method D4464-201.

Step C2) relates to a second activation using an activating electron donor, preferably an alcohol, more preferably methanol, ethanol, or propanol, most preferably ethanol. Ethanol is preferred over methanol in view of the toxicity of methanol. The activating electron donor used in step C2) may, in an embodiment, be the same as the activating electron donor used in step C1).

In an embodiment, step C1) comprises a first activation step using an activating electron donor, preferably methanol or ethanol, most preferred ethanol; and a metal alkoxide compound of formula $M^1(OR^2)_{v-w}(OR^3)_w$ preferably titanium tetraethoxide (TET); and step C2) comprises a second activation step is carried out using an activating electron donor, preferably ethanol.

Activating Metal Alkoxide Compound

As metal alkoxide used during step C1) compounds according to $M^1(OR^2)_{v-w}(OR^3)_w$ are preferred, more preferred are compounds wherein $M^1$=Ti., viz. compounds of formula $Ti(OR^2)_{4-w}(OR^3)_w$. Each $R^2$ group may be the same as another $R^2$ group or may be different. In an embodiment all $R^2$ groups are the same. Each $R^3$ group may be the same as another $R^3$ group or may be different. In an embodiment all $R^3$ groups are the same. The value of w (in both formulas shown above) is preferably 0—giving rise to the formulas $M^1(OR^2)_v$ and $Ti(OR^2)_4$—, the activating compound being for example a titanium tetraalkoxide containing 4 to 32 carbon atoms in total from four alkoxy groups. The four alkoxide groups in the compound may be the same or may differ independently. Preferably, at least one of the alkoxy groups in the compound is an ethoxy group. More preferably, the compound is a tetraalkoxide, such as titanium tetraethoxide (TET) wherein w=0; and each $R^2$ group=ethyl. In a preferred embodiment, the following combination of an activating electron donor and a metal alkoxide compound is used is step C1), viz. TET and ethanol.

Preferably, a Ti-based compound, for example titanium tetraethoxide, is used together with an alcohol, like ethanol or hexanol, or with an ester compound, like ethylacetate, ethylbenzoate or a phthalate ester, or together with an ether, like dibutylether, or with pyridine.

For the two or more activating compounds as are used in step C1) their order of addition is not critical, but may affect catalyst performance depending on the compounds used. A skilled person may optimize their order of addition based on some experiments. The activating compounds of step C1) can be added together or sequentially. Preferably, an activating electron donor compound is first added to the solid support where after a metal alkoxide compound is added.

Activating Electron Donors

Examples of suitable activating electron donors that may be used in step C1 and/or C2) are carboxylic acids, carboxylic acid anhydrides, carboxylic acid esters, carboxylic acid halides, alcohols, ethers, ketones, amines, amides, nitriles, aldehydes, alkoxides, sulfonamides, thioethers, thioesters and other organic compounds containing one or more hetero atoms, such as nitrogen, oxygen, sulfur and/or phosphorus.

Preferably, an alcohol is used as the activating electron donor. In an embodiment, in both C1) and C2) an alcohol is used as the activating electron donor. In a specific embodiment, a Ti-compound is used as a metal alkoxide compound in step C1) and an alcohol is used in both step C1) and step C2) as activating electron donor. More preferably, the alcohol is a linear or branched aliphatic or aromatic alcohol having 1 to 12 carbon atoms, more preferably a linear C1 to C3 alcohol. Even more preferably, the alcohol is selected from methanol, ethanol, butanol, isobutanol, hexanol, xylenol and benzyl alcohol. Most preferably, the alcohol is ethanol or methanol, preferably ethanol. Due to the toxicity of methanol, ethanol is preferred.

Conditions During Step C) (for Both C1) and C2))

Preferably, at least one of the activating compound(s) is added slowly for instance during a period of 0.01 to 6 hours, preferably during 0.05 to 4 hours, most preferably during 0.1 to 2.5 hours. The molar ratio of each of the activating compounds in step C1) and step C2) to Mg of the solid support range between wide limits and is, for instance, from 0.001 to 1.0, preferably, the molar ratio is from 0.005 to 0.5, more preferably from 0.01 to 0.2. The temperature in step C) can be in the range from −20° C. to 70° C., preferably from −10° C. to 60° C., more preferably in the range from −5° C. to 50° C. The reaction time after the activating compound(s) has(have) been added is preferably from 0 to 5 hours.

An inert dispersant may be used in step C), preferably being a hydrocarbon solvent. The dispersant may be for example an aliphatic or aromatic hydrocarbon with 1 to 20 carbon atoms. Preferably, the dispersant is an aliphatic hydrocarbon, more preferably pentane, iso-pentane, hexane or heptane, heptane being most preferred. Starting from a solid Mg-containing product of controlled morphology obtained in step B), said morphology is not negatively affected during treatment with the activating compound during step C). The solid second intermediate reaction product obtained in step C) is considered to be an adduct of the Mg-containing compound and the at least two activating compounds as defined in steps C1) and C2), and is still of controlled morphology.

Phase III: Preparing the Procatalyst

Step D) involves reacting the second intermediate reaction product, obtained in step C) with a halogen-containing Ti-compound, optionally an activator and at least one internal electron donor, preferably in several sub steps or stages.

Step D) may comprise several stages (e.g. I, II and III and optionally IV). During each of these consecutive stages the solid support is contacted with a catalytic species. In other words, the addition or reaction of said catalytic species may be repeated one or more times. Preferably, the same catalytic species is used each stage. Preferably $TiCl_4$ is used as catalytic species in all stages of step D). The catalyst species may be added first followed by addition of an activator and/or donor in any of the stages.

In an embodiment, said sub steps or stages comprise:
D-I) in a first stage: contacting the second intermediate reaction product obtained in step C) with a halogen-containing Ti-compound, optionally an activator and optionally (a portion of) an internal donor;
D-II) in a second stage: contacting the product obtained in step D-I) with a halogen-containing Ti-compound, and optionally (a portion of) an internal electron donor;
D-III) in a third stage: contacting the product obtained in step D-II) with a halogen-containing Ti-compound, and optionally (a portion of) an internal electron donor;
D-IV) optionally in a fourth stage: contacting the product obtained in step D-III) with a halogen-containing Ti-compound, and optionally (a portion of) an internal electron donor;
wherein said internal electron donor is added during at least one of the stages D-I, D-II, D-III, and D-IV to obtain said procatalyst.

Without wishing to be bound by any theory, the inventors believe that an activator has as main purpose to increase catalyst productivity (an activator may be added in any of the stages); whereas the internal donor has as main purpose to control product stereospecificity, namely xylene solubles, This phase III, also called phase D, is described in detail in WO2015091984 A1 of the same applicant, page 28 line 15 to page 31, line 13, which complete section is incorporated here by reference.

In an embodiment, during D-I) the halogen-containing Ti-compound, optionally the activator and optionally the internal electron are mixed at a temperature of between −30° C. to 120° C., preferably between 0° C. and 100° C., more preferably between 10° C. and 60° C. and mixed for a period of between 10 to 150 minutes, preferably between 40 and 100 minutes; then the reaction temperature is increased to a temperature of between 60° C. and 140° C., preferably between 90° C. and 120° C. for a period of between 10 to 150 minutes, preferably between 40 and 100 minutes.

In an embodiment, during D-II) the obtained reaction mixture is mixed at a temperature of between 60° C. and 140° C., preferably between 90° C. and 120° C. for a period of between 10 to 150 minutes, preferably between 40 and 100 minutes.

In an embodiment, during D-III) and optionally D-IV) the obtained reaction mixture is mixed at a temperature of between 60° C. and 140° C., preferably between 90° C. and 120° C. for a period of between 10 to 150 minutes, preferably between 20 and 80 minutes.

Catalytic Species

Step D) involves, in all sub steps reacting the (activated) solid support with a transition metal halide (e.g. titanium halide, chromium halide, hafnium halide, zirconium halide, vanadium halide) but preferably titanium halide, e.g. $TiX_4$ wherein X is chloride or fluoride, preferably chloride. Step D (also called step iii)) is described in detail in WO2015091984 A1 page 29 line 28 to page 31, line 13, which complete section is incorporated here by reference.

Activator

An activator may be added during step D). The molar ratio of the activator relative to the magnesium may vary between wide limits, for instance from 0.02 to 1.0. Preferably, this molar ratio is from 0.05 to 0.8; more preferably from 0.1 to 0.6; and most preferably from 0.1 to 0.5. In an embodiment, an activator is present during this step D). Several types of activators can be used, such as benzamide, alkylbenzoates, and monoesters. Each of these will be discussed below.

A benzamide activator has a structure as disclosed in WO2015091983 A1 of the same applicant, page 13, line 13-page 14, line 37, which complete section is incorporated here by reference. The activator may be a benzamide according to formula X:

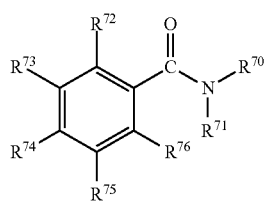

wherein $R^{70}$ and $R^{71}$ are each independently selected from hydrogen or an alkyl, and $R^{72}$, $R^{73}$, $R^{74}$, $R^{75}$, $R^{76}$ are each independently selected from hydrogen, a heteroatom (preferably a halide), or a hydrocarbyl group, selected from alkyl, alkenyl, aryl, aralkyl, alkoxycarbonyl or alkylaryl groups, and one or more combinations thereof, preferably benzamide (BA or BA-2H, $R^{70}$-$R^{76}$=H), N-methyl benzamide (BA-HMe, $R^{70}$=Me, $R^{71}$-$R^{76}$=H) or N,N-dimethyl benzamide (BA-2Me, $R^{70}$, $R^{71}$=Me and $R^{72}$-$R^{76}$=H). Suitable non-limiting examples of "benzamides" include benzamide (BA-2H), methylbenzamide (BA-HMe) or N,N-dimethylbenzamide (BA-2Me). Without wishing to be bound by a particular theory the present inventors believe that the fact that the most effective activation is obtained when the benzamide activator is added during stage I has the following reason. It is believed that the benzamide activator will bind the catalytic species and is later on substituted by the internal donor when the internal donor is added.

A detailed description of regarding the use of mono-esters as activators is to be found in WO2015091984 A1 of the same applicant, page 42 line 12-page 43, line 24, which section is incorporated here by reference. A detailed description of regarding the use of alkylbenzoates as activators is to be found in WO2015091984 A1 of the same applicant, page 42 lines 1-12, which section is incorporated here by reference. The activation is for example selected from the group consisting of butyl formate, ethyl acetate, amyl acetate, butyl acetate, ethyl acrylate, methyl methacrylate, isobutyl methacrylate, an alkyl benzoate, such as ethyl p-methoxy benzoate, methyl p-ethoxybenzoate, ethyl p-ethoxybenzoate, ethyl benzoate, methyl benzoate, propyl benzoate, ethyl p-chlorobenzoate, ethyl p-bromobenzoate, methyl-p-toluate and ethyl-naphthate; preferably ethyl acetate, ethyl benzoate, benzoyl chloride, ethyl p-bromobenzoate, n-propyl benzoate, and benzoic anhydride, more preferably ethyl benzoate.

Internal Donors

At least one internal electron donor is added during step D). Also mixtures of internal electron donors can be used. Examples of internal electron donors are disclosed below. The molar ratio of the internal electron donor relative to the magnesium may vary between wide limits, for instance from 0.01 to 0.75. Preferably, this molar ratio is from 0.02 to 0.5; more preferably from 0.03 to 0.3. The internal donor may be added in one single portion during one of the stages I, II, III or IV. The internal donor may also be added in split portions, e.g. in two portions or in three portions or even more. When the internal donor is added in two portions it may for example be added in Stage I and II or in stage II and III. When the internal donor is added in three portions, it may for example be added in stages I, II and III or in stages II, III and IV.

In an embodiment, the internal electron donor is added in two portions wherein the amount of internal donor is split between these two portions in a weight ratio of from 80%:20% to 20%:80%, more preferably 60%:40% to 40%:60%, most preferably approximately 50%:50%.

In an embodiment, the internal electron donor is added in three portions wherein the amount of internal donor is split between these three portions in a weight ratio of from 20% to 40% for each portion, wherein the total of the three portions is 100%, most preferably each portion is between 30 to 35% of the total amount of the internal donor.

In an embodiment, as internal donor a carbonate-carbamate compound according to formula A is used:

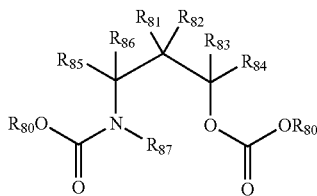

Formula A wherein: $R^{81}$, $R^{82}$, $R^{83}$, $R^{84}$, $R^{85}$, and $R^{86}$ are the same or different and are independently selected from a group consisting of hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{87}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; each $R^{80}$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; $R^{80}$ is preferably selected from the group consisting of alkyl having 1 to 30 carbon atoms, preferably 1 to 20 carbon atoms, more preferably 1 to 6 carbon atoms, even more preferably methyl, ethyl, n-propyl, i-propyl, n-butyl, 2-butyl, t-butyl, pentyl or hexyl, most preferably ethyl. N is a nitrogen atom; O is an oxygen atom; and C is a carbon atom; preferably 4-[(ethoxycarbonyl)(methyl)amino]pentan-2-yl ethyl carbamate (AB-OEt). More information about this internal electron donor an several embodiments can be found in in WO2015/185489 which is incorporated by reference into the present application. The preparation of this donor is disclosed in WO2015/185489, Example A which is incorporated by reference into the present application.

In an embodiment, the activator is added during stage I and the internal donor is added during stages II and III and optionally IV, preferably said activator being a monoester, and the internal donor being a carbonate-carbamate. In a specific embodiment the activator EB is added during stage I and AB-OEt is added during stage II and stage III. In a specific embodiment the activator EB is added during stage I and AB-OEt is added during stages II, III and IV.

In an embodiment, during stage I of step D, EB is added as activator and wherein during stages II, III and IV, AB-OEt is added as internal donor in three portions, each portion having a weight ratio of from 30 to 35% wherein the total of the three portions equals 100%.

In an embodiment, during stage I of step D, EB is added as activator and wherein during stages II and III, AB-OEt is added as internal donor in two portions, each portion having a weight ratio of from 60%:40% to 40%:60% wherein the total of the two portions equals 100%.

More information about this internal electron donor an several embodiments can be found in in WO2015/185489 which is incorporated by reference into the present application. The preparation of this donor is disclosed in WO2015/185489, Example A which is incorporated by reference into the present application.

In a special embodiment, butyl magnesium Grignard is used in step A), TES is used in step B), TET and Ethanol are used in step C1) and ethanol is used in step C2), $TiCl_4$ is used as catalytic species in all stages of step D); EB is used as activator in step D-I), AB-OEt is used as internal donor in stages II and III. In a special embodiment, butyl magnesium Grignard is used in step A), TES is used in step B), TET and Ethanol are used in step C1) and ethanol is used in step C2), $TiCl_4$ is used as catalytic species in all stages of step D); EB is used as activator in step D-I), AB-OEt is used as internal donor in stages II, III and IV.

In a specific embodiment for the combination of EB and AB-OEt, stage I is carried out with EB added at a temperature of 25° C., heated to a reaction temperature of 115° C. and for a stirring time of 90 minutes; stage II is carried out at 115° C. for 60 minutes, stage III at 115° C. for 30 minutes and stage IV at 115° C. for 30 minutes.

In an embodiment, as internal donor an aminobenzoate compound according to Formula B is used

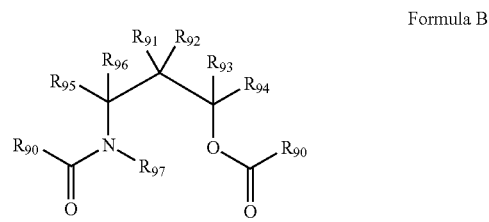

Formula B wherein each $R^{90}$ group is independently a substituted or unsubstituted aromatic group, preferably having between 6 and 20 carbon atoms; $R^{91}$, $R^{92}$, $R^{93}$, $R^{94}$, $R^{95}$, $R^{96}$ are each independently selected from a hydrogen or a hydrocarbyl group, preferably hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{97}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is nitrogen atom; O is oxygen atom; and C is carbon atom; preferably 4-[benzoyl(methyl)amino]pentan-2-yl benzoate (AB). More information about this internal electron donor an several embodiments can be found in in WO2014/001257 which is incorporated by reference into the present application. The preparation of this donor is disclosed in WO2014/001257, Examples which is incorporated by reference into the present application.

In an embodiment, the activator is added during stage I and the internal donor is added during stage III. In an embodiment, the activator is added during stage I and the internal donor is added during stages II and III and optionally IV. Preferably said activator being a monoester, and the internal donor being an aminobenzoate. In a specific embodiment the activator EB is added during stage I and AB is added during stage III. In a specific embodiment the activator EB is added during stage I and AB is added during stages II and III. In a specific embodiment the activator EB is added during stage I and AB is added during stages II and III and IV.

In an embodiment, during stage I of step D, EB is added as activator and wherein during stages II and III, AB is added as internal donor in two portions, each portion having a weight ratio of from 60%:40% to 40%:60% wherein the total of the two portions equals 100%.

In an embodiment, during stage I of step D, EB is added as activator and wherein during stages II, III and IV, AB is added as internal donor in three portions, each portion having a weight ratio of from 30 to 35% wherein the total of the three portions equals 100%.

In a special embodiment, butyl magnesium Grignard is used in step A), TES is used in step B), TET and ethanol are first used in step C1) and then ethanol is used in step C2), TiCl$_4$ is used as catalytic species in all stages of step D); EB is used as activator in step D-I), AB is used as internal donor in stages II and III. In a special embodiment, butyl magnesium Grignard is used in step A), TES is used in step B), TET and ethanol are first used in step C1) and then ethanol is used in step C2), TiCl$_4$ is used as catalytic species in all stages of step D); EB is used as activator in step D-I), AB is used as internal donor in stage III. In a special embodiment, butyl magnesium Grignard is used in step A), TES is used in step B), TET and Ethanol are used in step C1) and ethanol is used in step C2), TiCl$_4$ is used as catalytic species in all stages of step D); EB is used as activator in step D-I), AB is used as internal donor in stages II, III and IV.

In a specific embodiment for the combination of EB and AB, stage I is carried out with EB added at a temperature of 25° C., heated to reaction temperature of 115° C. and for a stirring time of 90 minutes; stage II is carried out at 115° C. for 60 minutes, stage III at 115° C. for 30 minutes and stage IV at 115° C. for 30 minutes.

In an embodiment, as internal donor a 1,3-diether represented by the Formula C, is used:

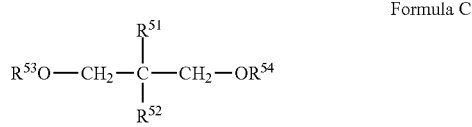

Formula C wherein R$^{51}$ and R$^{52}$ are each independently selected from a hydrogen or a hydrocarbyl group selected from alkyl, alkenyl, aryl, aralkyl, alkoxycarbonyl or alkylaryl groups, and one or more combinations thereof, and wherein R$^{53}$ and R$^{54}$ are each independently a hydrocarbyl group, selected from e.g. alkyl, alkenyl, aryl, aralkyl, alkoxycarbonyl or alkylaryl groups, and one or more combinations thereof. Said hydrocarbyl group of R$^{53}$-R$^{54}$ may be linear, branched or cyclic; it may be substituted or unsubstituted; it may contain one or more heteroatoms; it may have from 1 to 10 carbon atoms, preferably from 1 to 8 carbon atoms, more preferably from 1-6 carbon atoms. Preferably 9,9-bis(methoxymethyl)fluorene (Flu). More information about this internal electron donor and several embodiments can be found in in WO2015/091983 which is incorporated by reference into the present application.

In an embodiment, the activator is added during stage I and the internal donor is added during stage I, preferably said activator being a benzamide, such as N,N-dimethylbenzamide (BA-2Me), and the internal donor being a 1,3-diether. In a specific embodiment the activator BA-2Me is added during stage I and Flu is added during stage I.

In an embodiment, the activator is added during stage I and the internal donor is added during stages I and II, preferably said activator being a benzamide, and the internal donor being a 1,3-diether. In a specific embodiment the activator BA-2Me is added during stage I and Flu is added during stage I and stage II.

In an embodiment, during stage I of step D, BA-2Me is added as activator and wherein during stages I and II, Flu is added as internal donor in two portions, each portion having a weight ratio of from 60%:40% to 40%:60% wherein the total of the two portions equals 100%.

In a special embodiment, butyl magnesium Grignard is used in step A), TES is used in step B), TET and Ethanol are used in step C1) and Ethanol is used in step C2), TiCl$_4$ is used as catalytic species in all stages of step D); BA-2Me is used as activator in step D-I), Flu is used as internal donor in stages I and II.

In a specific embodiment for the combination of BA-2Me and Flu, stage I is carried out with BA-2Me added at a temperature of 25° C., heated to a reaction temperature of 115° C. and a stirring time of 60 minutes; stage II is carried out at 115° C. for 60 minutes, stage III at 115° C. for 60 minutes and stage IV at 115° C. for 30 minutes. In a specific embodiment, stage I is carried out with BA-2Me added at a temperature of 25° C., heated to a reaction temperature of 115° C. and a stirring time of 60 minutes; stage II is carried out at 105° C. for 60 minutes, stage III at 105° C. for 60 minutes and stage IV at 105° C. for 30 minutes.

Co-Catalyst

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", as described in WO2015091984 A1 of the same applicant, page 59 line 1 to page 60 line 30, which is incorporated here by reference.

External Electron Donor

The catalyst system according to the present invention preferably comprises an external electron donor. One of the functions of an external donor compound is to affect the stereoselectivity of the catalyst system in polymerization of olefins having three or more carbon atoms. Therefore it may be also referred to as a selectivity control agent. Examples of external donors suitable for use in the present invention are the internal donors benzoic acid esters and 1,3-diethers. In addition, the following external donors may be used: alkylamino-alkoxysilanes, alkyl-alkoxysilane, imidosilanes, and alkylimidosilanes. The aluminum/external donor molar ratio in the polymerization catalyst system preferably is from 0.1 to 200; more preferably from 1 to 100. Mixtures of external donors may be present and may include from about 0.1 mol. % to about 99.9 mol. % of a first external donor and from about 99.9 mol. % to about 0.1 mol. % of either a second or the additional alkoxysilane external donor disclosed below. When a silane external donor is used, the Si/Ti molar ratio in the catalyst system can range from 0.1 to 80, preferably from 0.1 to 60, even more preferably from 1 to 50 and most preferably from 2 to 30.

Documents EP1538167 and EP1783145 disclose a Ziegler-Natta catalyst type comprising an organo-silicon compound as external donor that is represented by formula Si(OR$^c$)$_3$(NR$^d$R$^e$), wherein R$^c$ is a hydrocarbon group having 1 to 6 carbon atoms, R$^d$ is a hydrocarbon group having 1 to 12 carbon atoms or hydrogen atom, and R$^e$ is a hydrocarbon group having 1 to 12 carbon atoms used as an external electron donor. Examples of suitable external donors according to the present invention are known from WO2015091984 A1, being compounds according to Formula III, alkyl-alkoxysilanes according to Formula IV, organosilicon compounds having formula $Si(OR^a)_{4-n}R^b{}_n$, imidosilanes according to Formula I, alkylimidosilanes according to Formula I' as described on page 61 line 26 to page 67 line 8 which is incorporated here by reference. Alkoxy silane halide are used for preparing imidosilane and alkylimidosilane internal donors and are, respectively, according to Formula XXIVa: $Z_nSi(OR^{11})_{4-n}$ and Formula XXIVa: $Z_nSi(OR^{11})_{4-n-m}(R^{12})_m$. In the alkoxy silane halide represented by Formula XXIVa and XXIVb, Z is halogen group, and more preferably a chlorine group; n=1, 2 or 3; m=1 or 2. Specific examples regarding the external donor, considering Formula I' in WO2015091984 A1, are described in WO2015091984 A1 of the same applicant, page 67 lines 9-22, which is incorporated here by reference.

The additional compound(s) in the external donor according to the invention may be one or more alkoxysilanes, as described in WO2015091984 A1 of the same applicant, page 67 line 24 to page 69 line 4, which section is incorporated here by reference. In an embodiment, the silane-compound for the additional external donor is dicyclopentyl dimethoxysilane, di-isopropyl dimethoxysilane, di-isobutyl dimethyoxysilane, methylcyclohexyl dimethoxysilane, n-propyl trimethoxysilane, n-propyltriethoxysilane, dimethylamino triethoxysilane, and one or more combinations thereof. Preferably, the external donor is an alkyl-alkoxysilane according to formula IV (preferably n-propyl trimethoxysilane or n-propyl triethoxysilane) or cyclohexylmethyldimethoxysilane or another dialkyldialkoxysilane.

Catalyst System

The invention also relates to a process to make the catalyst system by contacting a Ziegler-Natta type procatalyst, a co-catalyst and optionally one or more external electron donors. The procatalyst, the co-catalyst and the external donor can be contacted in any way known to the skilled person in the art; and as also described herein, more specifically as in the Examples. The invention further relates to a process of preparing a polyolefin by contacting at least one olefin with a polymerization catalyst system comprising the procatalyst according to the present invention. Preferably, the polyolefin made by using the catalyst system of the present invention is a polypropylene. For instance, the external donor in the catalyst system according to the present invention can be complexed with the co-catalyst and mixed with the procatalyst (pre-mix) prior to contact between the procatalyst and the olefin. The external donor can also be added independently to the polymerization reactor. The procatalyst, the co-catalyst, and the external donor can be mixed or otherwise combined prior to addition to the polymerization reactor. Contacting the olefin with the catalyst system according to the present invention can be done under standard polymerization conditions, known to the skilled person in the art. See for example Pasquini, N. (ed.) "Polypropylene handbook" $2^{nd}$ edition, Carl Hanser Verlag Munich, 2005. Chapter 6.2 and references cited therein.

Polymerization Process

The polymerization process may be a gas phase, a slurry or a bulk polymerization process, operating in one or more than one reactor. One or more olefin monomers can be introduced in a polymerization reactor to react with the procatalyst and to form an olefin-based polymer (or a fluidized bed or agitated bed of polymer particles). Polymerization in a slurry (liquid phase) as well as information about the polyolefins that are/may be prepared are described in WO2015091984 A1 of the same applicant, page 70 line 15 to page 71 line 23 which section is incorporated here by reference; information about gas-phase polymerization processes are as described in WO2015091984 A1 of the same applicant, page 71 line 25 to page 72 line 26 which is incorporated here by reference.

Olefin

The olefin according to the invention may be selected from mono- and di-olefins containing from 2 to 40 carbon atoms; see also WO2015091984 A1 of the same applicant, page 72 line 28 to page 73 line 5 which section is incorporated here by reference. Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, butene, hexene, heptene, octene.

Polyolefin

The present invention also relates to a polyolefin, preferably a polypropylene obtained or obtainable by a process, comprising contacting an olefin, preferably propylene or a mixture of propylene and ethylene with the procatalyst according to the present invention. More information about the polymers formed is disclosed WO2015091984 A1 of the same applicant, page 73 lines 6-23 and 25-34 and page 74 line 26 page 75, line 24 which section is incorporated by reference entirely. The present invention also relates to a polyolefin, preferably a propylene-based polymer obtained or obtainable by a process as described herein above, comprising contacting propylene or a mixture of propylene and ethylene with a catalyst system according to the present invention. In one embodiment the present invention relates to the production of a homopolymer of polypropylene. Several polymer properties are discussed here.

Xylene soluble fraction (XS) is preferably from about 0.5 wt % to about 10 wt %, or from about 0.5 wt % to about 8 wt %, or from 1.0 to 6 wt %. The production rate is preferably from about 1 kg/g/hr to about 100 kg/g/hr, or from about 20 kg/g/hr to about 90 kg/g/hr. MFR is preferably from about 0.01 g/10 min to about 2000 g/10 min, or from about 0.01 g/10 min to about 1000 g/10 min; or from about 0.1 g/10 min to about 500 g/10 min, or from about 0.5 g/10 min to about 150 g/10 min, or from about 1 g/10 min to about 100 g/10 min.

Use of Polyolefin

The invention also relates to the use of the polyolefins, preferably the propylene-based polymers (also called polypropylenes) according to the invention in injection moulding, blow moulding, extrusion moulding, compression moulding, casting, thin-walled injection moulding, etc. for example in food contact applications. Furthermore, the invention relates to a shaped article comprising the polyolefin, preferably the propylene-based polymer according to the present invention. The polyolefin, preferably the propylene-based polymer according to the present invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging applications both for food and non-food segments. This includes pails and containers and yellow fats/margarine tubs and dairy cups.

The invention is now further elucidated by the following non-limiting examples.

EXAMPLES

Example 1

Step A)
Preparation of Grignard Reagent

A 1.7 L stirred flask, fitted with a reflux condenser and a funnel, was filled with magnesium powder (40.0 g, 1.65 mol). The flask was brought under nitrogen. The magnesium was dried at 80° C. for 2 hours under nitrogen purge, after which dibutyl ether (200 ml), iodine (0.05 g) and n-chlorobutane (10 ml) were successively added and stirred at 120 rpm. The temperature was maintained at 80° C. and a mixture of n-chlorobutane (146 ml) and dibutyl ether (1180 ml) was slowly added over 3 hours. The reaction mixture was stirred for another 3 hours at 80° C. Then the stirring and heating were stopped and the small amount of solid material was allowed to settle for 24 hours. By decanting the colorless solution above the precipitate, a solution of butyl magnesium chloride with a concentration of 0.90 mol Mg/L was obtained.

Step B) Preparation of the First Intermediate Reaction Product

Preparation of Support

The solution of reaction product of step A (500 ml, 0.45 mol Mg) and 260 ml of a solution of tetraethoxysilane (TES) in dibutyl ether (DBE), (47 ml of TES and 213 ml of DBE), were cooled to 5° C., and then were fed simultaneously to a mixing device (minimixer) of 0.45 ml volume equipped with a stirrer and jacket. The minimixer was cooled to 5° C. by means of cold water circulating in the minimixer's jacket. The stirring speed in the minimixer was 1000 rpm. From the mixing device, the mixed components were directly dosed into a 1.3 liter reactor fitted with blade stirrer and containing 350 ml of dibutyl ether. The dosing temperature of the reactor was 35° C. and the dosing time was 360 min. On completion of the dosing, the reaction mixture was heated up to 60° C. in 30 minutes and held at this temperature for 1 hour. Then the stirring was stopped and the solid substance was allowed to settle. The supernatant was removed by decanting. The solid substance was washed three times using with 700 ml of heptane at a reactor temperature of 50° C. for three times. A pale yellow solid substance, reaction product B (the solid first intermediate reaction product; the support), was obtained upon drying with a nitrogen purge. The average particle size of support was 20 μm.

Step C) Activation of Support
Step C1) First Activation of Support

In inert nitrogen atmosphere at 20° C. in a 1000 ml glass flask equipped with a mechanical agitator was filled with 50 g of reaction product B, dispersed in 500 ml of heptane and stirred at 250 rpm. Subsequently, a solution of 2.7 ml ethanol (EtOH/Mg=0.1) in 20 ml heptane was dosed under stirring during 1 hour. After keeping the reaction mixture at 20° C. for 30 minutes, a solution of 9.5 ml titanium tetraethoxide (TET/Mg=0.1) in 20 ml of heptane was added for 1 hour. The slurry was slowly allowed to warm up to 30° C. over 30 minutes and held at that temperature for another 2 hours. Finally, the supernatant liquid was decanted from the solid reaction product (the second intermediate reaction product; first activated support) which was washed once with 500 ml of heptane at 30° C. and dried using a nitrogen purge.

Step C2) Second Activation of Support

In inert nitrogen atmosphere at 25° C. in a 1000 ml glass flask equipped with a mechanical agitator was filled with 50 g of second intermediate reaction product C dispersed in 500 ml of heptane and stirred at 250 rpm. Subsequently, a solution of 6.3 ml ethanol (EtOH/Mg=0.3), 20.8 ml of toluene and 37.5 ml of heptane was dosed at 25° C. under stirring during 1 hour. The slurry was slowly allowed to warm up to 30° C. over 30 minutes and held at that temperature for another 3 hours. Finally, the supernatant liquid was decanted from the solid reaction product (the third intermediate reaction product; second activated support) which was washed once with 500 ml of heptane at 25° C. and dried using a nitrogen purge.

Step D) Preparation of the Procatalyst A
Stage I of Procatalyst Preparation

A 300 ml reactor-filter flask was brought under nitrogen and 125 mL of titanium tetrachloride was added, then 5.5 g of second activated support obtained in step C2) in 15 ml of heptane was added to the reactor at 25° C. Then, 0.89 g of N,N-dimethylbenzamide (BA-2Me/Mg=0.15 molar ratio) in 4 ml of chlorobenzene was added to the reactor in 10 minutes, and 1.0 g of 9,9-bis-methoxymethyl-9H-fluorene (Flu/Mg=0.1 molar ratio) in 4 ml of chlorobenzene was added to the reactor in 10 minutes. Temperature of reaction mixture was increased to 100° C. and then the reaction mixture was stirred at 100° C. for 60 minutes. The contents of the flask were filtered, after which the solid product was washed with chlorobenzene (125 ml) at 100 to 105° C. for 20 minutes. Then, the contents of the flask were filtered.

Stage II of Procatalyst Preparation

A mixture of titanium tetrachloride (62.5 ml) and chlorobenzene (62.5 ml) was added to the reactor. The reaction mixture was stirred at 115° C. for 60 minutes. Then, the contents of the flask were filtered.

Stage III of Procatalyst Preparation

A mixture of titanium tetrachloride (62.5 ml) and chlorobenzene (62.5 ml) was added to the reactor. The reaction mixture was stirred at 115° C. for 60 minutes. Then, the contents of the flask were filtered.

Stage IV of Procatalyst Preparation

A mixture of titanium tetrachloride (62.5 ml) and chlorobenzene (62.5 ml) was added to the reactor. The reaction mixture was stirred at 115° C. for 30 minutes. Then, the contents of the flask were filtered.

Work Up of Procatalyst

The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid procatalyst A produced is given in Table 1.

Example 2

Preparation of the Procatalyst B

Steps A-C) were carried out as in Example 1. Step D) was carried out as follows.

Stage I of Procatalyst Preparation

A 300 ml reactor-filter flask was brought under nitrogen and 125 mL of titanium tetrachloride was added, then 5.5 g of second activated support obtained in step C2) in 15 ml of heptane was added to the reactor. The contents of the reactor were stirred for 60 minutes at room 25° C. Then, 0.89 g of N,N-dimethylbenzamide (BA-2Me/Mg=0.15 molar ratio) in 4 ml of chlorobenzene was added to the reactor in 10 minutes, and 0.5 g of 9,9-bis-methoxymethyl-9H-fluorene (Flu/Mg=0.05 molar ratio) in 4 ml of chlorobenzene was added to the reactor in 10 minutes. Temperature of reaction mixture was increased to 100° C. and then the reaction mixture was stirred at 100° C. for 60 minutes. The contents of the flask were filtered, after which the solid product was washed with chlorobenzene (125 ml) at 100 to 105° C. for 20 minutes. Then, the contents of the flask were filtered.

Stage II of Procatalyst Preparation

A mixture of titanium tetrachloride (62.5 ml) and chlorobenzene (62.5 ml) was added to the reactor. Then, 0.5 g of 9,9-bis-methoxymethyl-9H-fluorene (Flu/Mg=0.05 molar ratio) in 4 ml of chlorobenzene was added to the reactor in 10 minutes. The reaction mixture was stirred at 115° C. for 60 minutes. Then, the contents of the flask were filtered.

Stage III of Procatalyst Preparation

A mixture of titanium tetrachloride (62.5 ml) and chlorobenzene (62.5 ml) was added to the reactor. The reaction mixture was stirred at 115° C. for 60 minutes. Then, the contents of the flask were filtered.

Stage IV of Procatalyst Preparation

A mixture of titanium tetrachloride (62.5 ml) and chlorobenzene (62.5 ml) was added to the reactor. The reaction mixture was stirred at 115° C. for 30 minutes. Then, the contents of the flask were filtered.

Work Up of Procatalyst

The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid procatalyst B produced is given in Table 1.

Example 3

Preparation of the Procatalyst C

Steps A), B), C1) and C2) were carried out as in Example 1. Step D) was carried out as in Example 2 except that stages II, III and IV were carried out at 105° C. instead of 115° C. The composition of the solid procatalyst C produced is given in Table 1.

Example 4

Preparation of the Procatalyst D

Steps A), B), C1) and C2) were carried out as in Example 1. Step D) was carried out as in Example 2, except in stage I of step D) 0.7 g instead of 0.5 g of 9,9-bis-methoxymethyl-9H-fluorene was used and in stage II of step D) 0.7 g instead of 0.5 g of 9,9-bis-methoxymethyl-9H-fluorene was used. The composition of the solid procatalyst D produced is given in Table 1.

Example 5

Preparation of the Procatalyst E

Steps A), B), C1) and C2) were carried out as in Example 1. Step D) was carried out as in Example 2, except in stage I of step D) 1.0 g instead of 0.5 g of 9,9-bis-methoxymethyl-9H-fluorene was used and in stage II stage of step D) 1.0 g instead of 0.5 g of 9,9-bis-methoxymethyl-9H-fluorene was used. The composition of the solid procatalyst E produced is given in Table 1.

Example 6

Preparation of the Procatalyst F

Steps A), B), C1) and C2) were carried out as in Example 1. Step D) was carried out as follows.

Stage I of Procatalyst Preparation

A 300 ml reactor-filter flask was brought under nitrogen and 125 mL of titanium tetrachloride was added, then 5.5 g of second activated support obtained in step C2) in 15 ml of heptane was added to the reactor at 25° C. Then, 1.78 ml of ethylbenzoate, EB (EB/Mg=0.30 molar ratio) in 4 ml of chlorobenzene was added to the reactor in 10 minutes. Temperature of reaction mixture was increased to 115° C. and then the reaction mixture was stirred at 115° C. for 90 minutes. The contents of the flask were filtered, after which the solid product was washed with chlorobenzene (125 ml) at 100 to 105° C. for 20 minutes. Then, the contents of the flask were filtered.

Stage II of Procatalyst Preparation

A mixture of titanium tetrachloride (62.5 ml) and chlorobenzene (62.5 ml) was added to the reactor. Then, 0.60 g of 4-[(ethoxycarbonyl)(methyl)amino]pentan-2-yl-ethyl carbamate (AB-OEt/Mg=0.06) in 4 ml of chlorobenzene was added to the reactor in 10 minutes. The reaction mixture was stirred at 115° C. for 60 minutes. Then, the contents of the flask were filtered.

Stage III of Procatalyst Preparation

A mixture of titanium tetrachloride (62.5 ml) and chlorobenzene (62.5 ml) was added to the reactor. Then, 0.48 g of 4-[(ethoxycarbonyl)(methyl)amino]pentan-2-yl-ethyl carbamate (AB-OEt/Mg=0.05) in 4 ml of chlorobenzene was added to the reactor in 10 minutes. The reaction mixture was stirred at 115° C. for 30 minutes. Then, the contents of the flask were filtered.

Stage IV of Procatalyst Preparation

A mixture of titanium tetrachloride (62.5 ml) and chlorobenzene (62.5 ml) was added to the reactor. The reaction mixture was stirred at 115° C. for 30 minutes. Then, the contents of the flask were filtered.

Work Up of Procatalyst

The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid procatalyst F produced is given in Table 1.

Example 7

Preparation of the Procatalyst G

Steps A), B), C1) and C2) were carried out as in Example 1. Step D) was carried out as follows.

Stage I of Procatalyst Preparation

A 300 ml reactor-filter flask was brought under nitrogen and 125 mL of titanium tetrachloride was added, then 5.5 g of second activated support obtained in step C2) in 15 ml of heptane was added to the reactor at 25° C. Then, 1.78 ml of ethylbenzoate, EB (EB/Mg=0.30 molar ratio) in 4 ml of chlorobenzene was added to the reactor in 10 minutes. Temperature of reaction mixture was increased to 115° C.

and then the reaction mixture was stirred at 115° C. for 90 minutes. The contents of the flask were filtered, after which the solid product was washed with chlorobenzene (125 ml) at 100 to 105° C. for 20 minutes. Then, the contents of the flask were filtered.

Stage II of Procatalyst Preparation

A mixture of titanium tetrachloride (62.5 ml) and chlorobenzene (62.5 ml) was added to the reactor. Then, 0.36 g of 4-[(ethoxycarbonyl)(methyl)amino]pentan-2-yl-ethyl carbamate (AB-OEt/Mg=0.03) in 4 ml of chlorobenzene was added to the reactor in 10 minutes. The reaction mixture was stirred at 115° C. for 60 minutes. Then, the contents of the flask were filtered.

Stage III of Procatalyst Preparation

A mixture of titanium tetrachloride (62.5 ml) and chlorobenzene (62.5 ml) was added to the reactor. Then, 0.36 g of 4-[(ethoxycarbonyl)(methyl)amino]pentan-2-yl-ethyl carbamate (AB-OEt/Mg=0.03) in 4 ml of chlorobenzene was added to the reactor in 10 minutes. The reaction mixture was stirred at 115° C. for 30 minutes. Then, the contents of the flask were filtered.

Stage IV of Procatalyst Preparation

A mixture of titanium tetrachloride (62.5 ml) and chlorobenzene (62.5 ml) was added to the reactor. Then, 0.36 g of 4-[(ethoxycarbonyl)(methyl)amino]pentan-2-yl-ethyl carbamate (AB-OEt/Mg=0.03) in 4 ml of chlorobenzene was added to the reactor in 10 minutes. The reaction mixture was stirred at 115° C. for 30 minutes. Then, the contents of the flask were filtered.

Work Up of Procatalyst

The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid procatalyst G produced is given in Table 1.

Example 8

Preparation of the Procatalyst H

Steps A), B), C1) and C2) were carried out as in Example 1. Step D) is carried out as follows.

Stage I of Procatalyst Preparation

A 300 ml reactor-filter flask was brought under nitrogen and 125 mL of titanium tetrachloride was added, then 5.5 g of second activated support obtained in step C2) in 15 ml of heptane was added to the reactor at 25° C. Then, 1.78 ml of ethylbenzoate, EB (EB/Mg=0.30 molar ratio) in 4 ml of chlorobenzene was added to the reactor in 10 minutes. Temperature of reaction mixture was increased to 115° C. and then the reaction mixture was stirred at 115° C. for 90 minutes. The contents of the flask were filtered, after which the solid product was washed with chlorobenzene (125 ml) at 100 to 105° C. for 20 minutes. Then, the contents of the flask were filtered.

Stage II of Procatalyst Preparation

A mixture of titanium tetrachloride (62.5 ml) and chlorobenzene (62.5 ml) was added to the reactor. The reaction mixture was stirred at 115° C. for 60 minutes. Then, the contents of the flask were filtered.

Stage III of Procatalyst Preparation

A mixture of titanium tetrachloride (62.5 ml) and chlorobenzene (62.5 ml) was added to the reactor. Then, 0.51 g of 4-[benzoyl(methyl)amino]pentan-2-yl benzoate (AB/Mg=0.04) in 4 ml of chlorobenzene was added to the reactor in 10 minutes. The reaction mixture was stirred at 115° C. for 30 minutes. Then, the contents of the flask were filtered.

Stage IV Up of Procatalyst Preparation

A mixture of titanium tetrachloride (62.5 ml) and chlorobenzene (62.5 ml) was added to the reactor. The reaction mixture was stirred at 115° C. for 30 minutes. Then, the contents of the flask were filtered.

Work Up of Procatalyst

The solid product obtained was washed five times with 125 ml of heptane starting at 60° C. with 5 minutes stirring per wash prior to filtration. The temperature was gradually reduced from 60 to 25° C. during the washings. Finally, the solid product obtained was dried using a nitrogen purge at a temperature of 25° C. for 2 hours. The composition of the solid procatalyst G produced is given in Table 1.

Example 9

Preparation of the Procatalyst I

Step A')
Preparing Grignard Reagent

A stirred flask, fitted with a reflux condenser and a funnel, was filled with magnesium powder (24.3 g). The flask was brought under nitrogen. The magnesium was heated at 80° C. for 1 hour, after which dibutyl ether (150 ml), iodine (0.03 g) and n-chlorobutane (4 ml) were successively added. After the color of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butyl magnesium chloride with a concentration of 1.0 mol Mg/l was obtained.

Step B') Preparation of the First Intermediate Reaction Product

Preparation of Support

This step was carried out as described in Example XX of EP 1 222 214 B1, except that the dosing temperature of the reactor was 35° C., the dosing time was 360 min and a stirrer was used. 250 ml of dibutyl ether was introduced to a 1 liter reactor. The reactor was thermostated at 35° C.

The solution of reaction product of step A' (360 ml, 0.468 mol Mg) and 180 ml of a solution of tetraethoxysilane (TES) in dibutyl ether (DBE), (55 ml of TES and 125 ml of DBE), were cooled to 10° C., and then were dosed simultaneously to a mixing device of 0.45 ml volume supplied with a stirrer and jacket. From the mixing device, the mixed components were directly introduced into the reactor. The mixing device (minimixer) was cooled to 10° C. by means of cold water circulating in the minimixer's jacket. Dosing time was 360 min. The stirring speed in the minimixer was 1000 rpm.

On the dosing completion the reaction mixture was heated up to 60° C. and kept at this temperature for 1 hour. Then the stirring was stopped and the solid substance was allowed to settle. The supernatant was removed by decanting. The solid substance was washed three times using 500 ml of heptane. As a result, a pale yellow solid substance, reaction product B' (the solid first intermediate reaction product; the support), was obtained, suspended in 200 ml of heptane. The average particle size of support was 22 µm and span value (d90−d10)/d50=0.5.

Step C') Preparation of Second Intermediate Reaction Product

Activation of Support

Support activation was carried out as described in Example IV of WO/2007/134851 to obtain the second intermediate reaction product.

Step C1') First Activation

In inert nitrogen atmosphere at 20° C. a 250 ml glass flask equipped with a mechanical agitator was filled with slurry of 5 g of reaction product B' dispersed in 60 ml of heptane. Subsequently a solution of 0.22 ml ethanol (EtOH/Mg=0.1) in 20 ml heptane was dosed under stirring during 1 hour. After keeping the reaction mixture at 20° C. for 30 minutes, a solution of 0.79 ml titanium tetraethoxide (TET/Mg=0.1) in 20 ml of heptane was added for 1 hour. The slurry was slowly allowed to warm up to 30° C. for 90 min and kept at that temperature for another 2 hours. Finally the supernatant liquid was decanted from the solid reaction product (the second intermediate reaction product; activated support) which was washed once with 90 ml of heptane at 30° C.

Step C2') Second Activation

Under an inert nitrogen atmosphere at 20° C. a 250 ml glass flask equipped with a mechanical agitator was filled with a slurry of 5 g of the reaction product of step C1') dispersed in 60 ml of heptane. Subsequently a solution of 0.52 ml methanol (MeOH/Mg=0.3 mol) in 20 ml heptane was dosed under stirring during 1 hour. After keeping the reaction mixture at 20° C. for 30 minutes the slurry was slowly allowed to warm up to 30° C. for 30 min and kept at that temperature for another 2 hours. Finally the supernatant liquid was decanted from the solid reaction product C' which was washed once with 90 ml of heptane at 30° C.

Step D') Preparation of the Procatalyst

Stage I of Procatalyst Preparation

A reactor was brought under nitrogen and 125 ml of titanium tetrachloride was added to it. The reactor was heated to 100° C. and a suspension, containing about 5.5 g of activated support obtained in step C2') in 15 ml of heptane, was added to it under stirring. The reaction mixture was kept at 110° C. for 10 min. Then ethyl benzoate (EB/Mg=0.25 mol) was added in 2 ml of chlorobenzene. The reaction mixture was kept for 60 min at 110° C. Then the stirring was stopped and the solid substance was allowed to settle. The supernatant was removed by decanting, after which the solid product was washed with chlorobenzene (125 ml) at 100° C. for 20 min. Then the washing solution was removed by decanting.

Stage II of Procatalyst Preparation

A mixture of titanium tetrachloride (62.5 ml) and chlorobenzene (62.5 ml) was added. The temperature of reaction mixture was increased to 115° C. and stirred for 30 minutes. Then the stirring was stopped and the solid substance was allowed to settle.

Stage III of Procatalyst Preparation

A mixture of titanium tetrachloride (62.5 ml) and chlorobenzene (62.5 ml) was added. The temperature of reaction mixture was increased to 115° C. and 4-[benzoyl(methyl) amino]pentan-2-yl benzoate (aminobenzoate, AB, AB/Mg=0.15 mol) in 2 ml of chlorobenzene was added to reactor. Then the reaction mixture was kept at 115° C. for 30 min. After which the stirring was stopped and the solid substance was allowed to settle. The supernatant was removed by decanting.

Stage IV of Procatalyst Preparation

A mixture of titanium tetrachloride (62.5 ml) and chlorobenzene (62.5 ml) was added. The reaction mixture was kept at 115° C. for 30 min, after which the solid substance was allowed to settle. The supernatant was removed by decanting.

Work Up of Procatalyst

The solid was washed five times using 150 ml of heptane at 60° C., after which the procatalyst, suspended in heptane, was obtained. The composition of the solid procatalyst I produced is given in Table 1.

Comparative Example CE-1

Preparation of the Procatalyst CE-A

Step A')

Preparing Grignard Reagent

A stirred flask, fitted with a reflux condenser and a funnel, was filled with magnesium powder (24.3 g). The flask was brought under nitrogen. The magnesium was heated at 80° C. for 1 hour, after which dibutyl ether (150 ml), iodine (0.03 g) and n-chlorobutane (4 ml) were successively added. After the color of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butyl magnesium chloride with a concentration of 1.0 mol Mg/l was obtained.

Step B') Preparation of the First Intermediate Reaction Product

Preparation of Support

This step was carried out as described in Example XX of EP 1 222 214 B1, except that the dosing temperature of the reactor was 35° C., the dosing time was 360 min and a stirrer was used. 250 ml of dibutyl ether was introduced to a 1 liter reactor. The reactor was thermostated at 35° C.

The solution of reaction product of step A' (360 ml, 0.468 mol Mg) and 180 ml of a solution of tetraethoxysilane (TES) in dibutyl ether (DBE), (55 ml of TES and 125 ml of DBE), were cooled to 10° C., and then were dosed simultaneously to a mixing device of 0.45 ml volume supplied with a stirrer and jacket. From the mixing device, the mixed components were directly introduced into the reactor. The mixing device (minimixer) was cooled to 10° C. by means of cold water circulating in the minimixer's jacket. Dosing time was 360 min. The stirring speed in the minimixer was 1000 rpm.

On the dosing completion the reaction mixture was heated up to 60° C. and kept at this temperature for 1 hour. Then the stirring was stopped and the solid substance was allowed to settle. The supernatant was removed by decanting. The solid substance was washed three times using 500 ml of heptane. As a result, a pale yellow solid substance, reaction product B' (the solid first intermediate reaction product; the support), was obtained, suspended in 200 ml of heptane. The average particle size of support was 22 μm and span value (d90–d10)/d50=0.5.

Step C') Preparation of the Second Intermediate Reaction Product

Activation of Support

Support activation was carried out as described in Example IV of WO/2007/134851 to obtain the second intermediate reaction product. Under inert nitrogen atmosphere at 20° C. a 250 ml glass flask equipped with a mechanical agitator was filled with slurry of 5 g of reaction product of step B' dispersed in 60 ml of heptane.

Subsequently a solution of 0.22 ml ethanol (EtOH/Mg=0.1) in 20 ml heptane was dosed under stirring during 1 hour. After keeping the reaction mixture at 20° C. for 30 minutes, a solution of 0.79 ml titanium tetraethoxide (TET/Mg=0.1) in 20 ml of heptane was added for 1 hour.

The slurry was slowly allowed to warm up to 30° C. for 90 min and kept at that temperature for another 2 hours. Finally the supernatant liquid was decanted from the solid reaction product C' (the second intermediate reaction product; activated support) which was washed once with 90 ml of heptane at 30° C.

Step D') Preparation of Procatalyst

Stage I of Procatalyst Preparation

A 250 mL reactor was brought under nitrogen and 125 ml of titanium tetrachloride was added to it. The reactor was heated to 90° C. under stirring and a suspension, containing about 5.5 g of activated support obtained in step C') in 15 ml of heptane, was added to it under stirring. Then N,N-dimethylbenzamide (BA-2Me/Mg=0.15 molar ratio) in 2 ml of chlorobenzene was added to reactor. Then 9,9-bis-methoxymethyl-9H-fluorene (Flu/Mg=0.1 molar ratio) in 2 ml of chlorobenzene was added. The reaction mixture was kept at 90° C. for 60 min. The solid was allowed to settle and was washed with 125 ml chlorobenzene at 90° C. for 15-20 min. The solid was allowed to settle and decanted.

Stage II of Procatalyst Preparation

A mixture of 62.5 ml of titanium tetrachloride and 62.5 ml of chlorobenzene was added to reactor. The reaction mixture was kept at 90° C. for 30 minutes under stirring. The solid was allowed to settle and decanted.

Stage III of Procatalyst Preparation

A mixture of 62.5 ml of titanium tetrachloride and 62.5 ml of chlorobenzene was added to reactor, the temperature was set to 115° C. to reactor. Temperature of reaction mixture was maintained at 115° C. and the reaction mixture was kept at 115° C. for 30 min. Then the stirring was stopped and the solid substance was allowed to settle. The supernatant was removed by decanting.

Stage IV of Procatalyst Preparation

A mixture of 62.5 ml of titanium tetrachloride and 62.5 ml of chlorobenzene was added to reactor, the temperature was set to 115° C. to reactor. Temperature of reaction mixture was maintained at 115° C. and the reaction mixture was kept at 115° C. for 30 min. Then the stirring was stopped and the solid substance was allowed to settle. The supernatant was removed by decanting.

Work Up of Procatalyst

The solid substance obtained was washed five times using 100-150 ml of heptane at 60° C., after which the procatalyst, suspended in heptane, was obtained. The composition of the solid catalyst CE-A produced is given in Table 1.

Comparative Example CE-2

Preparation of the Procatalyst CE-B

Steps A'), B') and C') were carried out as in comparative Example CE-1. Step D') is carried out as follows.

Stage I of Procatalyst Preparation

A reactor was brought under nitrogen and 125 ml of titanium tetrachloride was added to it. The reactor was heated to 100° C. and a suspension, containing about 5.5 g of activated support C'' in 15 ml of heptane, was added to it under stirring. Then the temperature of reaction mixture was increased to 110° C. for 10 min and 1.76 g of ethylbenzoate (EB) in a EB/Mg molar ratio of 0.3 in 2 ml of chlorobenzene was added to reactor and the reaction mixture was kept at 110° C. for 60 min. Then the stirring was stopped and the solid substance was allowed to settle. The supernatant was removed by decanting, after which the solid product was washed with chlorobenzene (125 ml) at 100° C. for 20 min. Then the washing solution was removed by decanting.

Stage II of Procatalyst Preparation

A mixture of titanium tetrachloride (62.5 ml) and chlorobenzene (62.5 ml) was added. The reaction mixture was kept at 115° C. Then 0.55 gram of internal donor 4-[(ethoxycarbonyl)(methyl)amino]pentan-2-yl ethyl carbamate (AB-OEt/Mg molar ratio=0.50) in 2 ml of chlorobenzene was added and stirred at 115° C. for 60 min, after which the solid substance was allowed to settle. The supernatant was removed by decanting.

Stage III of Procatalyst Preparation

A mixture of titanium tetrachloride (62.5 ml) and chlorobenzene (62.5 ml) was added. The reaction mixture was kept at 115° C. Then 0.44 gram of internal donor 4-[(ethoxycarbonyl)(methyl)amino]pentan-2-yl ethyl carbamate (AB-OEt/Mg molar ratio=0.40) in 2 ml of chlorobenzene was added and stirred at 115° C. for 30 min, after which the solid substance was allowed to settle. The supernatant was removed by decanting.

Stage IV of Procatalyst Preparation

A mixture of titanium tetrachloride (62.5 ml) and chlorobenzene (62.5 ml) was added. The reaction mixture was kept at 115° C. for 30 minutes after which the solid substance was allowed to settle. The supernatant was removed by decanting.

Work Up of Procatalyst

The solid substance obtained was washed five times using 150 ml of heptane at 60° C., after which the procatalyst CE-B, suspended in heptane, was obtained. The composition of the solid procatalyst CE-B produced is given in Table 1.

Polymerization of Propylene Using Procatalyst A, B, C, D, E, F, G, H and I as Well as Procatalyst CE-A and CE-B.

Liquid pool propylene polymerization was carried out in a one gallon bench scale reactor. The method of polymerization involved baking the polymerization reactor at 110° C. for 60 min, applying three high pressure (15 bar) nitrogen purges at 110° C., then lowering the reactor temperature to 30° C. whilst purging the reactor with nitrogen. Then the reactor was purged three times, with 50 g of propylene for each purge. Then, 1.375 kg of liquid propylene was introduced to the reactor followed by the addition of 200 psig hydrogen to the reactor from an 75 mL stainless steel cylinder.

The reactor temperature was then raised to 62° C., and stirring speed set to 500 rpm. Then, 0.25 mmol of the neat external electron donor, cyclohexylmethyl-dimethoxysilane, was injected to the reactor. Then, 2.0 mmol of co-catalyst, triethylaluminium was injected in the reactor. Then procatalyst, corresponding to 0.01 mmol Ti, was injected to the reactor. The reactor temperature was raised to 67° C. and the stirring speed increased to 1500 rpm and polymerization was carried out for one hour. After this period, the propylene in the reactor was vented and the product polypropylene was obtained. The yield was determined after allowing the product to dry. Polymerization and product analysis results are given in Table 2.

TABLE 1

| Cat | Ex. | d50 [μm] | Mg [%] | Ti [%] | ID | ID [%] | Activator | Act. [%] | EtO [%] |
|---|---|---|---|---|---|---|---|---|---|
| A | 1 | 18.98 | 16.78 | 2.14 | Flu | 14.50 | BA-2Me | 1.19 | 1.85 |
| B | 2 | 21.10 | 16.00 | 1.97 | Flu | 16.30 | BA-2Me | 1.10 | 2.30 |
| C | 3 | 22.37 | 13.30 | 1.80 | Flu | 14.50 | BA-2Me | 1.00 | 2.10 |
| D | 4 | 19.43 | 16.73 | 2.04 | Flu | 16.51 | BA-2Me | 1.24 | 1.99 |
| E | 5 | 21.14 | 14.58 | 1.50 | Flu | 21.04 | BA-2Me | 0.50 | 1.88 |
| F | 6 | 20.23 | 20.16 | 2.36 | AB-OEt | 6.23 | EB | 1.45 | 2.60 |
| G | 7 | 22.98 | 18.88 | 2.23 | AB-OEt | 6.50 | EB | 1.71 | 2.82 |
| H | 8 | 22.16 | 19.65 | 2.40 | AB | 8.41 | EB | 6.68 | 1.48 |
| I | 9 | 17.64 | 14.64 | 2.17 | AB | 5.10 | EB | 2.30 | 2.60 |
| CE-A | CE-1 | 18.33 | 18.20 | 1.95 | Flu | 16.00 | BA-2Me | 1.24 | 2.90 |
| CE-B | CE-2 | 17.48 | 14.77 | 2.09 | AB-OEt | 9.86 | EB | 0.70 | 2.40 |

TABLE 2

| Cat | Ex. | Prod. [kg/g cat] | BD [kg/m³] | APS [mm] | fines [%] | Mw [g/mol] | Mn [g/mol] | MWD | MI [2.16 Kg] | XS [%] |
|---|---|---|---|---|---|---|---|---|---|---|
| A | 1 | 31.3 | 371 | 0.436 | 0.10 | 228302 | 48005 | 4.80 | 7.2 | 2.89 |
| B | 2 | 37.6 | 409 | 0.551 | 0.15 | 259500 | 60000 | 4.30 | 10.6 | 1.98 |
| C | 3 | 35.4 | 397 | 0.526 | 0.29 | 254871 | 69766 | 3.65 | 7.2 | 2.30 |
| D | 4 | 35.0 | 417 | 0.454 | 0.55 | 263737 | 63837 | 4.13 | 13.7 | 2.05 |
| E | 5 | 33.0 | 384 | 0.546 | 0.11 | 173000 | 38000 | 4.60 | 9.8 | 1.63 |
| F | 6 | 26.3 | 410 | — | — | 414003 | 71013 | 5.80 | — | 3.90 |
| G | 7 | 24.5 | 407 | — | — | 416743 | 78660 | 5.30 | — | 2.53 |
| H | 8 | 28.2 | 358 | — | — | 537651 | 73710 | 7.29 | 1.7 | 4.01 |
| I | 9 | 19.4 | 381 | — | — | 525914 | 60554 | 8.68 | — | 3.08 |
| CE-A | CE-1 | 12.4 | 326 | — | — | 193422 | 29176 | 6.63 | — | 2.50 |
| CE-B | CE-2 | 17.3 | 399 | — | — | 405694 | 61216 | 6.63 | — | 3.34 |

The effect of a second activation step, preferably with ethanol, can be observed from comparing Example 1 with Comparative Example 1 for an activator/internal donor combination of BA-2ME/Flu. The bulk density increases and the productivity more than doubles. The Mn increases (lower oligomers) and the MWD is narrower.

The effect of a second activation step, preferably with ethanol, can also be observed from comparing Example 6 with Comparative Example 2 for an activator/internal donor combination of EB/AB-OEt. The bulk density increases and the productivity increases; the Mn increases (lower oligomers) and the MWD is narrower.

The effect of using ethanol instead of methanol during the second activation step, can also be observed from comparing Example 8 with Example 9 for an activator/internal donor combination of EB/AB. The productivity increases; the Mn increases (lower oligomers) and the MWD is narrower.

What can moreover been seen from the examples, is that temperature during the process of the invention can surprisingly be used to control product parameters, such as MI, MWD and XS.

It is noted that the temperature in stages II, III and IV is decreased from 115° C. in Example 2 to 105° C. in Example 3 for a split addition of Flu over stage II and II. This decrease in temperature increases the Mn, decreases MWD and increases the XS. Hence the properties of the polymer may be tuned e.g. by tuning the temperature.

The split (e.g. double or triple) addition of internal donor improves the incorporation of the internal donor in the catalyst from, which represents a significant saving on donor utilization. It increases the productivity, bulk density, MI and decreases XS. Also, surprisingly the Mn is higher (lower oligomers) with split addition of the internal donor.

This can for example be observed when comparing Example 2 (double addition of Flu) with Example 1 (single addition of Flu). The split addition increases the productivity, the bulk density and the Mn, produces a more narrow MWD and decreases the XS.

This can for example be observed when comparing Example 7 (triple addition of AB-OEt) with Example 6 (double addition of AB-OEt). The triple split addition increases the Mn, produces a more narrow MWD and decreases the XS.

Surprising the procatalyst obtained with the inventive process was found to produce high procatalyst productivity, high bulk density, narrow molecular weight distribution, increased Mn (low oligomers) and low xylene solubles. Enhanced product physical and mechanical properties are expected such as for fibres, injection molded products and films with such products. Hence one or more objects of the present invention have been obtained.

CLAUSES

1. Process for the preparation of a procatalyst suitable for preparing a catalyst composition for olefin polymerization, said process comprising the steps of
   Step A) providing or preparing a compound $R^4_z MgX^4_{2-z}$ wherein
   * $R^4$, is independently selected from linear, branched or cyclic hydrocarbyl group independently selected from alkyl, alkenyl, aryl, aralkyl, or alkylaryl groups, and one or more combinations thereof;
   wherein said hydrocarbyl group may be substituted or unsubstituted, may contain one or more heteroatoms and preferably has from 1 to 20 carbon atoms;
   * $X^4$ is independently selected from the group consisting of fluoride (F—), chloride (Cl—), bromide (Br—) or iodide (I—), preferably chloride;

* z is in a range of larger than 0 and smaller than 2, being 0<z<2;

Step B) contacting the compound $R^4_z MgX^4_{2-z}$ with a silane compound $Si(OR^5)_{4-n}(R^6)_n$ to give a first intermediate reaction product, being a solid $Mg(OR^1)_x X^1_{2-x}$ wherein:
* $R^1$, $R^5$ and $R^6$ are each independently selected from linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;
* $X^1$ is independently selected from the group consisting of fluoride (F—), chloride (Cl—), bromide (Br—) or iodide (I—), preferably chloride;
* n is in range of 0 to 4, preferably n is from 0 up to and including 1;
* z is in a range of larger than 0 and smaller than 2, being 0<z<2;
* x is in a range of larger than 0 and smaller than 2, being 0<x<2;

Step C) activating said solid support, comprising two sub steps:
  Step C1) a first activation step by contacting the first intermediate reaction product obtained in step B) with at least one first activating compound being a metal alkoxide compound of formula $M^1(OR^2)_{v-w}(OR^3)_w$ or $M^2(OR^2)_{v-w}(R^3)_w$; wherein: $M^1$ is a metal selected from the group consisting of Ti, Zr, Hf, Al or Si; $M^2$ is a metal being Si; v is the valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms; and optionally a second activating compound being an activating electron donor; and
  Step C2) a second activation step by contacting the activated solid support obtained in step C1) with an activating electron donor; to obtain a second intermediate reaction product;

Step D) reacting the second intermediate reaction product obtained step C2) with a halogen-containing Ti-compound, optionally an activator and at least one internal electron donor to obtain said procatalyst.

2. Process according to clause 1, wherein step D) comprises the following stages:
  D-I) a first stage of contacting the second intermediate reaction product obtained in step C2) with a halogen-containing Ti-compound, optionally an activator and optionally (a portion of) an internal donor;
  D-II) a second stage of contacting the product obtained in step D-I) with a halogen-containing Ti-compound, and optionally (a portion of) an internal electron donor;
  D-III) a third stage of contacting the product obtained in step D-II) with a halogen-containing Ti-compound, and optionally (a portion of) an internal electron donor;
  D-IV) optionally a fourth stage of contacting the product obtained in step D-III) with a halogen-containing Ti-compound, and optionally (a portion of) an internal electron donor;

wherein said internal electron donor is added during at least one of the stages D-I, D-II, D-III, and D-IV.

3. Process according to any one of the preceding clauses, wherein as the metal alkoxide activating compound in step C1) titanium tetraethoxide (TET) is used and wherein ethanol as activating electron donor is used in step C1) as second activating compound and wherein during step C2) ethanol is used as activating electron donor.

4. Process according any one of the preceding clauses, wherein as activator one of the following is used: i) a monoester, preferably selected from the group consisting of butyl formate, ethyl acetate, amyl acetate, butyl acetate, ethyl acrylate, methyl methacrylate, isobutyl methacrylate, ethyl p-methoxy benzoate, methyl p-ethoxybenzoate, ethyl p-ethoxybenzoate, ethyl benzoate, methyl benzoate, propyl benzoate, ethyl p-chlorobenzoate, ethyl p-bromobenzoate, methyl-p-toluate and ethyl-naphthate, preferably ethyl acetate, ethyl benzoate, benzoyl chloride, ethyl p-bromobenzoate, n-propyl benzoate, and benzoic anhydride, more preferably ethyl benzoate; or ii) a benzamide according to formula X:

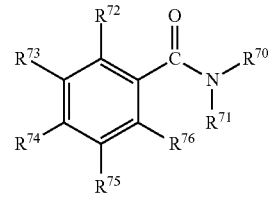

wherein $R^{70}$ and $R^{71}$ are each independently selected from hydrogen or an alkyl, and $R^{72}$, $R^{73}$, $R^{74}$, $R^{75}$, $R^{76}$ are each independently selected from hydrogen, a heteroatom (preferably a halide), or a hydrocarbyl group, selected from alkyl, alkenyl, aryl, aralkyl, alkoxycarbonyl or alkylaryl groups, and one or more combinations thereof, preferably benzamide (BA or BA-2H, $R^{70}$-$R^{76}$=H), N-methyl benzamide (BA-HMe, $R^{70}$=Me, $R^{71}$-$R^{76}$=H) or N,N-dimethyl benzamide (BA-2Me, $R^{70}$, $R^{71}$=Me and $R^{72}$-$R^{76}$=H).

5. Process according any one of the preceding clauses, wherein as internal donor one of the following is used: i) a carbonate-carbamate compound according to Formula A

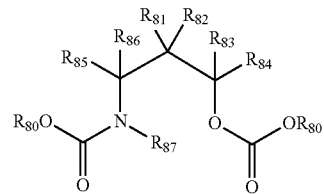

wherein: $R_{81}$, $R_{82}$, $R_{83}$, $R_{84}$, $R_{85}$, and $R_{86}$ are the same or different and are independently selected from a group consisting of hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R_{87}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; each $R_{80}$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; $R^{80}$ is preferably selected from the group consisting of alkyl having 1 to 30 carbon atoms, preferably 1 to 20 carbon atoms, more preferably 1 to 6 carbon atoms, even more preferably methyl, ethyl, n-propyl, i-propyl, n-butyl, 2-butyl, t-butyl, pentyl or hexyl, most preferably ethyl; N is nitrogen atom; O is oxygen atom; and C is carbon atom; preferably 4-[(ethoxycarbonyl)(methyl)amino]pentan-2-yl ethyl carbamate (AB-OEt); or (ii) an aminobenzoate compound according to formula B:

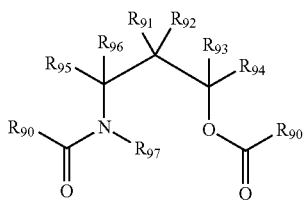

wherein each $R^{90}$ group is independently a substituted or unsubstituted aromatic group; $R^{91}$, $R^{92}$, $R^{93}$, $R^{94}$, $R^{95}$, and $R^{96}$ are each independently selected from a hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{97}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; N is a nitrogen atom; O is an oxygen atom; and C is a carbon atom; preferably 4-[benzoyl (methyl)amino]pentan-2-yl benzoate (AB);

or iii) a 1,3-diether represented by the Formula C,

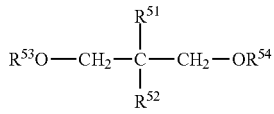

wherein $R^{51}$ and $R^{52}$ are each independently selected from a hydrogen or a hydrocarbyl group selected from alkyl, alkenyl, aryl, aralkyl, alkoxycarbonyl or alkylaryl groups, and one or more combinations thereof, and $R^{53}$ and $R^{54}$ are each independently a hydrocarbyl group, selected from e.g. alkyl, alkenyl, aryl, aralkyl, alkoxycarbonyl or alkylaryl groups, and one or more combinations thereof, preferably 9,9-bis(methoxymethyl)fluorene (Flu).

6. Process according to any one of the clauses 1-5, wherein during step D) BA-2Me is added as activator and Flu is added as internal donor.

7. Process according to any one of the clauses 1-5, wherein during step D) EB is added as activator and AB-OEt is added as internal donor.

8. Process according to any one of the clauses 1-5, wherein during step D) EB is added as activator and AB is added as internal donor.

9. Process according to any one of the clauses 2-8, wherein the internal electron donor is added in two portions during two stages of step D) wherein the amount of internal donor is split between these two portions in a weight ratio of from 80%:20% to 20%:80%, more preferably 60%:40% to 40%:60%, most preferably approximately 50%:50%.

10. Process according to any one of the clauses 2-8, wherein the internal electron donor is added in three portions during three stages of step D) wherein the amount of internal donor is split between these three portions in a weight ratio of from 20% to 40% for each portion, wherein the total of the three portions is 100%, most preferably each portion is between 30 to 35% of the total amount of the internal donor.

11. A procatalyst obtained or obtainable by the process according to any of clauses 1-10.

12. A catalyst system comprising a procatalyst according to clause 11, a co-catalyst and optionally an external electron donor.

13. Process for the preparation of polyolefins comprising the contacting of the catalyst system of clause 12 with at least one olefin, preferably a propylene to prepare polypropylene homopolymer or a mixture of propylene and an olefin, such as ethylene, butene or hexene, to prepare a propylene-olefin copolymer.

14. A polyolefin, preferably a polypropylene, obtainable by the process according to clause 13 or a shaped article comprising said polyolefin.

15. A polyolefin, preferably propylene-olefin copolymer, obtainable by the process according to clause 13 or a shaped article comprising said polyolefin.

The invention claimed is:
1. A process for the preparation of a procatalyst suitable for preparing a catalyst composition for olefin polymerization, said process comprising the steps of

Step A) providing or preparing a compound $R^4_z MgX^4_{2-z}$ wherein
* $R^4$, is independently a linear, branched or cyclic hydrocarbyl group independently selected from alkyl, alkenyl, aryl, aralkyl, alkylaryl groups, and one or more combinations thereof;
  wherein said hydrocarbyl group may be substituted or unsubstituted, and may contain one or more heteroatoms;
* $X^4$ is independently fluoride (F—), chloride (Cl—), bromide (Br—) or iodide (I—);
* z is in a range of larger than 0 and smaller than 2, being 0<z<2;

Step B) contacting the compound $R^4_z MgX^4_{2-z}$ with a silane compound $Si(OR^5)_{4-n}(R^6)_n$ to give a first intermediate reaction product, being a solid $Mg(OR^1)_x X^1_{2-x}$ wherein:
* $R^1$, $R^5$ and $R^6$ are each independently a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group may be substituted or unsubstituted, and may contain one or more heteroatoms;
* $X^1$ is independently fluoride (F—), chloride (Cl—), bromide (Br—) or iodide (I—);
* n is in range of 0 to 4;
* z is in a range of larger than 0 and smaller than 2, being 0<z<2;
* x is in a range of larger than 0 and smaller than 2, being 0<x<2;

Step C) activating said solid support, comprising two sub steps:
Step C1) a first activation step by contacting the first intermediate reaction product obtained in step B) with at least one first activating compound being a metal alkoxide compound of formula $M^1(OR^2)_{v-w}(OR^3)_w$ or $M^2(OR^2)_{v-w}(R^3)_w$; wherein: $M^1$ is a metal of Ti, Zr, Hf, Al or Si; $M^2$ is a metal being Si; v is the valency of $M^1$ or $M^2$ and w is smaller than v; $R^2$ and $R^3$ are each a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group may be substituted or unsubstituted, and may contain one or more heteroatoms; and a second activating compound being an activating electron donor; and Step C2) a second activation step by contacting the activated solid support obtained in step C1) with a second activating electron donor; to obtain a second intermediate reaction product;

Step D) reacting the second intermediate reaction product obtained in step C2) with a halogen-containing Ti-compound, optionally an activator prior to or simultaneous with the addition of at least one internal electron donor to obtain said procatalyst.

2. The process according to claim 1, wherein step D) comprises the following stages:

D-I) a first stage of contacting the second intermediate reaction product obtained in step C2) with the halogen-containing Ti-compound, optionally the activator and optionally a portion of the internal electron donor;

D-II) a second stage of contacting the product obtained in step D-I) with the halogen-containing Ti-compound, and optionally a portion of the internal electron donor;

D-III) a third stage of contacting the product obtained in step D-II) with the halogen-containing Ti-compound, and optionally a portion of the internal electron donor;

D-IV) optionally a fourth stage of contacting the product obtained in step D-III) with the halogen-containing Ti-compound, and optionally a portion of the internal electron donor;

wherein said internal electron donor is added during at least one of the stages D-I, D-II, D-III, and D-IV.

3. The process according to claim 1, wherein the first activating compound in step C1) is titanium tetraethoxide (TET) and wherein the second activating compound in step C1) is ethanol, and the second activating electron donor in step C2) is ethanol.

4. The process according to claim 1, wherein one of the following is added as the activator: i) a monoester; or ii) a benzamide according to formula X:

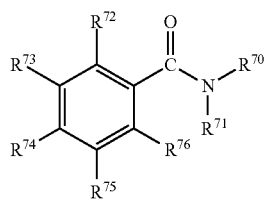

wherein $R^{70}$ and $R^{71}$ are each independently hydrogen or an alkyl, and $R^{72}$, $R^{73}$, $R^{74}$, $R^{75}$, and $R^{76}$ are each independently hydrogen, a heteroatom, or a hydrocarbyl group, selected from alkyl, alkenyl, aryl, aralkyl, alkoxycarbonyl, alkylaryl groups, and one or more combinations thereof.

5. The process according to claim 1, wherein one of the following is added as the internal electron donor: i) a carbonate-carbamate compound according to Formula A

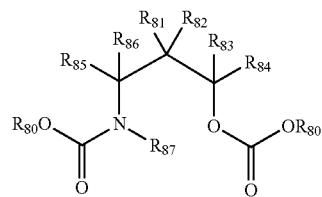

wherein: $R^{81}$, $R^{82}$, $R^{83}$, $R^{84}$, $R^{85}$, and $R^{86}$ are the same or different and are independently hydrogen or a linear, branched or cyclic hydrocarbyl group, selected from alkyl, alkenyl, aryl, aralkyl, alkylaryl groups, and one or more combinations thereof; $R^{87}$ is a hydrogen or a linear, branched or cyclic hydrocarbyl group, selected from alkyl, alkenyl, aryl, aralkyl, alkoxycarbonyl alkylaryl groups, and one or more combinations thereof; each $R^{80}$ group is independently a linear, branched or cyclic hydrocarbyl group selected from alkyl, alkenyl, aryl, aralkyl, alkylaryl groups, and one or more combinations thereof; $R^{80}$ is an alkyl having 1 to 30 carbon atoms; N is nitrogen atom; O is oxygen atom; and C is carbon atom; or (ii) an aminobenzoate compound according to formula B:

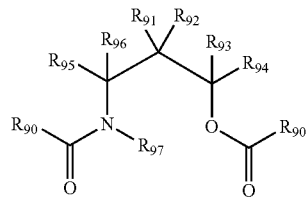

wherein each $R^{90}$ group is independently a substituted or unsubstituted aromatic group; $R^{91}$, $R^{92}$, $R^{93}$, $R^{94}$, $R^{95}$, and $R^{96}$ are each independently a hydrogen or a linear, branched or cyclic hydrocarbyl group, selected from alkyl, alkenyl, aryl, aralkyl, alkylaryl groups, and one or more combinations thereof; $R^{97}$ is a hydrogen or a linear, branched or cyclic hydrocarbyl group, selected from alkyl, alkenyl, aryl, aralkyl, alkoxycarbonyl, alkylaryl groups, and one or more combinations thereof; N is a nitrogen atom; O is an oxygen atom; and C is a carbon atom;

or iii) a 1,3-diether represented by the Formula C,

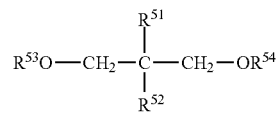

wherein $R^{51}$ and $R^{52}$ are each independently a hydrogen or a hydrocarbyl group selected from alkyl, alkenyl, aryl, aralkyl, alkoxycarbonyl, alkylaryl groups, and one or more combinations thereof, and $R^{53}$ and $R^{54}$ are each independently a hydrocarbyl group, selected from alkyl, alkenyl, aryl, aralkyl, alkoxycarbonyl, alkylaryl groups, and one or more combinations thereof.

6. The process according to claim 1, wherein during step D) N,N-dimethyl benzamide is added as the activator and 9,9-bis(methoxymethyl)fluorene is added as the internal electron donor.

7. The process according to any one of the claims 1-5, wherein during step D) ethylbenzoate is added as the activator and 4-[(ethoxycarbonyl)(methyl)amino]pentan-2-yl ethyl carbamate is added as the internal electron donor.

8. The process according to claim 1, wherein during step D) ethylbenzoate is added as the activator and 4-[benzoyl(methyl)amino]pentan-2-yl benzoate is added as the internal electron donor.

9. The process according to claim 2, wherein the internal electron donor is added in two portions during two stages of step D) wherein the amount of the internal electron donor is split between these two portions in a weight ratio of from 80%: 20% to 20%: 80%.

10. The process according to claim 2, wherein the internal electron donor is added in three portions during three stages of step D) wherein the amount of the internal electron donor is split between these three portions in a weight ratio of from 20% to 40% for each portion, wherein the total of the three portions is 100%.

11. The process according to claim 4, wherein
the activator is the monoester selected from the group consisting of butyl formate, ethyl acetate, amyl acetate, butyl acetate, ethyl acrylate, methyl methacrylate, isobutyl methacrylate, ethyl p-methoxy benzoate, methyl p-ethoxybenzoate, ethyl p-ethoxybenzoate, ethyl benzoate, methyl benzoate, propyl benzoate, ethyl p-chlorobenzoate, ethyl p-bromobenzoate, methyl-p-toluate and ethyl-naphthate, or the benzamide selected from a benzamide according to formula X wherein $R^{70}$-$R^{76}$ =H, methyl benzamide wherein $R^{70}$=methyl and $R^{71}$-$R^{76}$=H, and N,N-dimethyl benzamide wherein $R^{70}$, $R^{71}$=methyl and $R^{72}$-$R^{76}$=H; and the internal electron donor is 4-[(ethoxycarbonyl)(methyl)amino]pentan-2-yl ethyl carbamate, or 4-[benzoyl(methyl)amino]pentan-2-yl benzoate, or bis(methoxymethyl)fluorene.

* * * * *